United States Patent
Mostov et al.

(10) Patent No.: US 6,882,829 B2
(45) Date of Patent: Apr. 19, 2005

(54) INTEGRATED CIRCUIT INCORPORATING RF ANTENNA SWITCH AND POWER AMPLIFIER

(75) Inventors: Alexander Mostov, Rishon Letzion (IL); Dirk Leipold, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 567 days.

(21) Appl. No.: 10/114,227

(22) Filed: Apr. 2, 2002

(65) Prior Publication Data

US 2003/0190895 A1 Oct. 9, 2003

(51) Int. Cl.[7] .................................................. H04B 1/44
(52) U.S. Cl. ........................................... 455/83; 455/78
(58) Field of Search .......................... 455/73, 78, 82, 455/83; 257/347, 348, 349, 350, 351, 352, 353, 354; 333/101, 103, 109, 262; 327/365, 379, 389, 419, 427, 429, 434

(56) References Cited

U.S. PATENT DOCUMENTS

| | | | | |
|---|---|---|---|---|
| 3,577,019 A | * | 5/1971 | Storm | 327/541 |
| 4,253,162 A | * | 2/1981 | Hollingsworth | 365/156 |
| 5,608,610 A | | 3/1997 | Brzezinski | |
| 5,872,369 A | * | 2/1999 | Inokuchi | 257/66 |
| 5,924,019 A | * | 7/1999 | McDonald et al. | 455/83 |
| 6,259,901 B1 | | 7/2001 | Shinomiya et al. | |
| 6,271,727 B1 | | 8/2001 | Schmukler | |
| 6,288,612 B1 | | 9/2001 | Ueno et al. | |
| 6,579,750 B1 | * | 6/2003 | Krivokapic | 438/149 |
| 2002/0063270 A1 | * | 5/2002 | Nakatani et al. | 257/275 |
| 2002/0140040 A1 | * | 10/2002 | Hidaka et al. | 257/393 |
| 2003/0234699 A1 | * | 12/2003 | Nakano | 333/104 |

* cited by examiner

Primary Examiner—Lee Nguyen
Assistant Examiner—Raymond B. Persino
(74) Attorney, Agent, or Firm—Ronald O. Neerings; Wade James Brady, III; Frederick J. Telecky, Jr.

(57) ABSTRACT

A novel integrated circuit incorporating a transmit/receive antenna switch capable of being integrated using silicon based RF CMOS semiconductor processes and a power amplifier on the same substrate. The switch circuit is constructed whereby the substrate (i.e. bulk) terminals of the FETs are left floating thus improving the isolation and reducing the insertion loss of the switch. Floating the substrate of the transistors eliminates most of the losses caused by leakage paths through parasitic capacitances internal to the transistor thus improving the isolation and reducing the insertion loss of the switch. Alternatively, the substrate can be connected to the source or to ground via a resistor of sufficiently high value to effectively float the substrate.

25 Claims, 4 Drawing Sheets

INTEGRATED CIRCUIT INCORPORATING RF ANTENNA SWITCH AND POWER AMPLIFIER

FIELD OF THE INVENTION

The present invention relates generally to Radio Frequency (RF) communications systems and more particularly relates to an RF antenna switch constructed utilizing Field Effect Transistors (FETs) configured with floating substrate terminals wherein the switch and associated power amplifier are constructed in the same integrated circuit.

BACKGROUND OF THE INVENTION

Currently, high frequency radio frequency (RF) communications are becoming increasingly prevalent. Products touting wireless RF communication links are becoming increasingly popular among consumers. Today, there are an increasing number of new products, in addition to existing products being revamped that are being designed to incorporate wireless RF links.

Due to the explosive consumer demand for products sporting wireless communication links, there is a need for low cost transceivers that are suitable for mass manufacture. In most wireless applications, especially those designed to be mass-produced for the consumer market, it is desirable to reduce both the size and cost of wireless transceivers as much as possible. In the case of time division duplex (TDD) transceivers, manufacturers are constantly striving to reduce the size and cost of the power amplifier and transmit/receive antenna switch portions of the transceiver by integrating these functions onto a single low cost integrated circuit.

Satisfactory performance in such a component can only be achieved by reducing the insertion loss of the antenna switch when in the 'ON' state and to enhance the isolation of the switch when it is in the 'OFF' state. Presently, in most wireless transceivers designed for the 2.4 GHz ISM frequency band, the transmit/receive antenna switch is typically required to be constructed as an external GaAs RFIC in order to achieve satisfactory performance. Prior art attempts to integrate the transmit/receive antenna switch in a silicon CMOS process have resulted in switches having unacceptably high insertion losses when in the ON state and poor isolation in the OFF state.

In many applications, it is desirable to achieve antenna switch isolation of greater than 20 dB and less than 1 dB of insertion loss. Currently, such performance can only be achieved using external GaAs based RF integrated circuits. Such integrated circuits are based on much more exotic semiconductor processes and are significantly more expensive than conventional silicon based semiconductor processes. The low isolation characteristic of conventional silicon based integrated antenna switches, causes high leakage levels in the switch. In a bi-directional switch this translates to the receive signal leaking into the transmit circuit from the antenna in addition to the leakage of the transmit signal into the receive circuit. The losses due to leakage may be as high as 2 dB on the transmit and receive paths of the transceiver.

There is thus a need for a transmit/receive antenna switch that can be constructed in small size and at low cost using silicon based RF integrated circuit techniques, and is capable of achieving relatively low insertion losses in the ON state and high isolation in the OFF state.

SUMMARY OF THE INVENTION

The present invention is a novel transmit/receive antenna switch capable of being integrated using silicon based RF CMOS semiconductor processes. The switch circuit is constructed whereby the substrate (i.e. bulk) terminals of the FETs are left floating, thus improving the isolation and reducing the insertion loss of the switch. The switch is combined with a power amplifier and both functions integrated within the same integrated circuit.

Floating the substrate of the transistors eliminates most of the losses caused by leakage paths through parasitic capacitances internal to the transistor, thus improving the isolation and reducing the insertion loss of the switch. Alternatively, the substrate is connected to the source or to ground via a resistor of sufficiently high value to effectively float the substrate, i.e. the resistance is sufficiently high to achieve similar switch performance as when the substrate is left completely floating.

The switch constructed using FETs with floating substrates enables the integration of RF transmit/receive antenna switches in the same CMOS RFICs containing the power amplifier. This integration of functions is very useful and even crucial to cost sensitive applications such as Bluetooth, WLANs and cordless telephones. This is achieved by the reduction in the cost of the transceiver through the elimination of the need for high cost external GaAs RFICs. Moreover, the integration of the antenna switch with the power amplifier in CMOS enables a reduction in size of the transceiver circuit that is important in small size portable wireless devices.

Note that in many cases, one skilled in the wireless communication circuitry arts can easily modify existing antenna switch and power amplifier designs to incorporate the present invention in order to achieve increased performance and/or cost reduction.

There is thus provided in accordance with the present invention a Radio Frequency (RF) antenna switch circuit comprising first coupling means for electrically coupling an antenna to a transmitter circuit, second coupling means for electrically coupling the antenna to a receiver circuit, control means for establishing a signal path from the antenna to either the transmit circuit or the receiver circuit in accordance with a transmit/receive control signal and wherein the first coupling means and the second coupling means each comprise one or more field effect transistors (FETs) whose substrate terminals are configured to be substantially electrically floating.

There is also provided in accordance with the present invention a Radio Frequency (RF) antenna switch circuit comprising a first field effect transistor (FET) having a drain terminal electrically connected to a transmitter circuit, a source terminal electrically connected to an antenna, a gate terminal and a first substrate terminal, wherein the first substrate terminal is left substantially electrically floating, a second field effect transistor (FET) having a drain terminal electrically connected to a receiver circuit, a source terminal electrically connected to the antenna, a gate terminal and a second substrate terminal, wherein the second substrate terminal is left substantially electrically floating and a control circuit adapted to generate gate control signals applied to the gate terminals of the first FET and second FET so as to establish a signal path from the antenna to either the transmit circuit or the receiver circuit in accordance with a transmit/receive input control signal.

There is further provided in accordance with the present invention a monolithic integrated circuit comprising a radio Frequency (RF) antenna switch circuit comprising first coupling means for electrically coupling an antenna to a transmitter circuit, second coupling means for electrically coupling the antenna to a receiver circuit, control means for establishing a signal path from the antenna to either the transmit circuit or the receiver circuit in accordance with a transmit/receive switch control signal, wherein the first coupling means and the second coupling means each comprise one or more field effect transistors (FETs) whose substrate terminals are configured to be substantially electrically floating and a power amplifier comprising a differential input, an output, a gain control input and an enable input coupled to the transmit/receive switch control signal, the power amplifier operative to generate an amplified output signal at the output from a signal present at the differential input while enabled by the transmit/receive switch control signal.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| CMOS | Complementary Metal Oxide Semiconductor |
| DC | Direct Current |
| FET | Field Effect Transistor |
| IC | Integrated Circuit |
| ISM | Industrial Scientific Medical frequency band |
| PA | Power Amplifier |
| RF | Radio Frequency |
| RFIC | Radio Frequency Integrated Circuit |
| TDD | Time Division Duplexing |
| WLAN | Wireless Local Area Network |

DETAILED DESCRIPTION OF THE INVENTION

The present invention is a transmit/receive antenna switch capable of being integrated using silicon based RF CMOS semiconductor processes whereby the substrate (i.e. bulk) terminals of the FETs are left floating thus improving the isolation and reducing the insertion loss of the switch.

Figure 1:
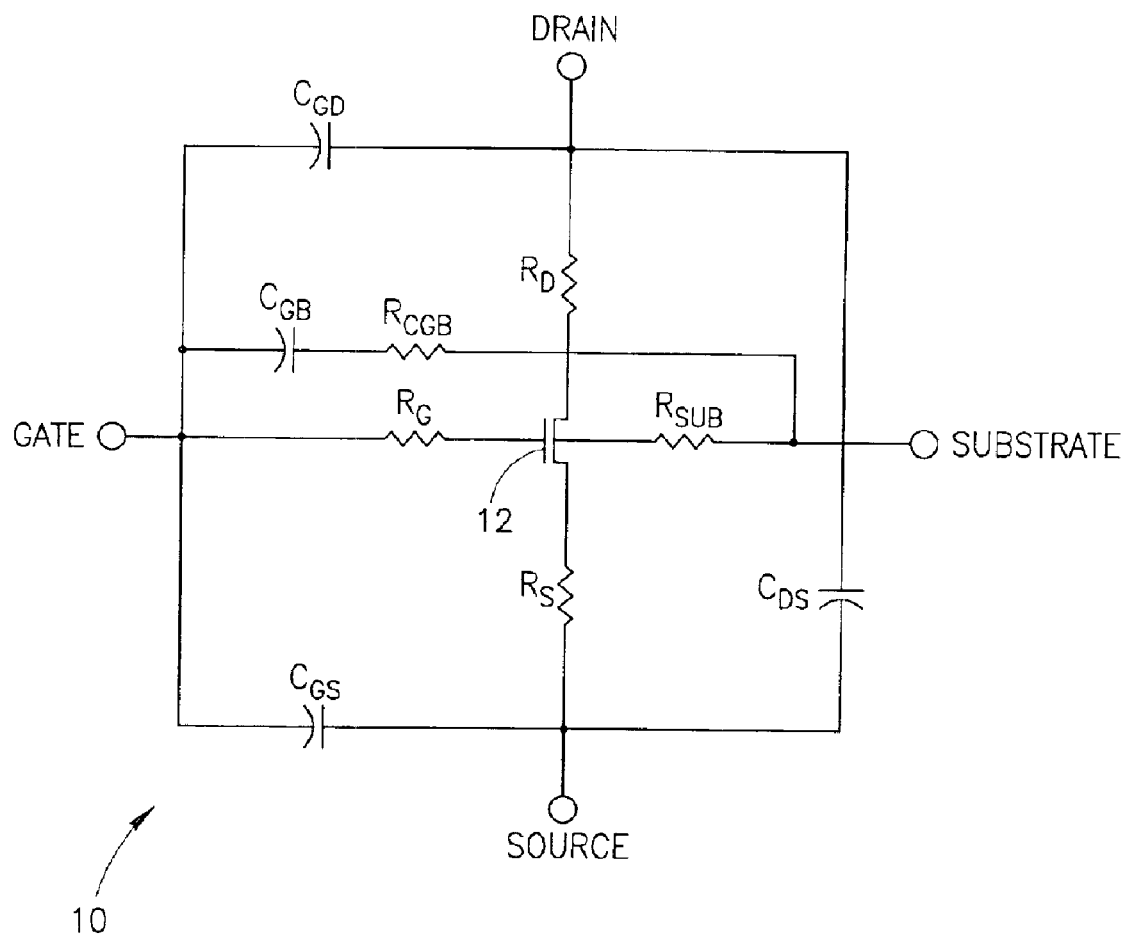
FIG. 1 is a schematic diagram of a circuit used to model a field effect transistor utilizing ideal components.

A schematic diagram of a circuit used to model a field effect transistor utilizing ideal components is shown in FIG. 1. The model of the FET, generally referenced 10, comprises an ideal field effect transistor 12 having a gate, source, drain and substrate terminals with resistances represented by $R_G$, $R_S$, $R_D$ and $R_{SUB}$, respectively. Parasitic capacitances between gate-drain, gate-source, gate-substrate and drain-source are modeled as $C_{GD}$, $C_{GS}$, $C_{GB}$ and $C_{DS}$, respectively. Gate to substrate resistance is represented as $R_{CGB}$ located in series with the gate-substrate parasitic capacitance $C_{GB}$.

In prior art circuits, the substrate terminal is connected to ground or connected to the drain (or source) terminal. Consider for example, a device used to switch a signal between source and drain terminals. Several leakage paths exist including (1) from source to drain through capacitances $C_{GS}$ and $C_{DG}$; (2) from source to drain through capacitance $C_{DS}$; (3) from both source and drain to ground through capacitance $C_{GB}$ and resister $R_{CGB}$ in the case when the substrate is connected to ground; and (4) from source to drain via $C_{GD}$ and $C_{GB}$ when substrate and source are connected.

All the above leakages function to degrade the isolation of the switch, especially at high frequencies such as the 2.4 GHz ISM frequency range. Placing inductance in parallel with the device across the drain and source terminals serves to tune some of the parasitic capacitance out of the circuit and thus improves the isolation and insertion losses of the device. In particular, adding an inductor is effective in tuning out $C_{GS}$, $C_{GD}$ and $C_{DS}$. The addition of an inductor is not effective, however, in tuning out the signal leakage caused by the gate-substrate capacitance $C_{GB}$.

In addition, connecting the substrate to the source, as is done in conventional circuits, introduces considerable loss between the drain and the source due to the highly doped P type well.

In accordance with the invention, these disadvantages are overcome by floating the substrate and thus eliminating most of the lossy path, thus improving the isolation and reducing the insertion of the switch. Alternatively, the substrate is connected to the source or to ground via a resistor of sufficiently high value to effectively float the substrate, i.e. the resistance is sufficiently high to achieve similar switch performance as when the substrate is left completely floating.

The switch constructed using FETs with floating substrates enables the integration of RF transmit/receive antenna switches in CMOS RFICs, which is useful and even crucial to many applications such as Bluetooth, WLANs and cordless telephones. This is achieved by the reduction in the cost of the transceiver through the elimination of the need for high cost external GaAs RFICs. Moreover, the integration of the antenna switch in CMOS enables a reduction in size of the transceiver circuit which is important in small size portable wireless devices.

Figure 2:
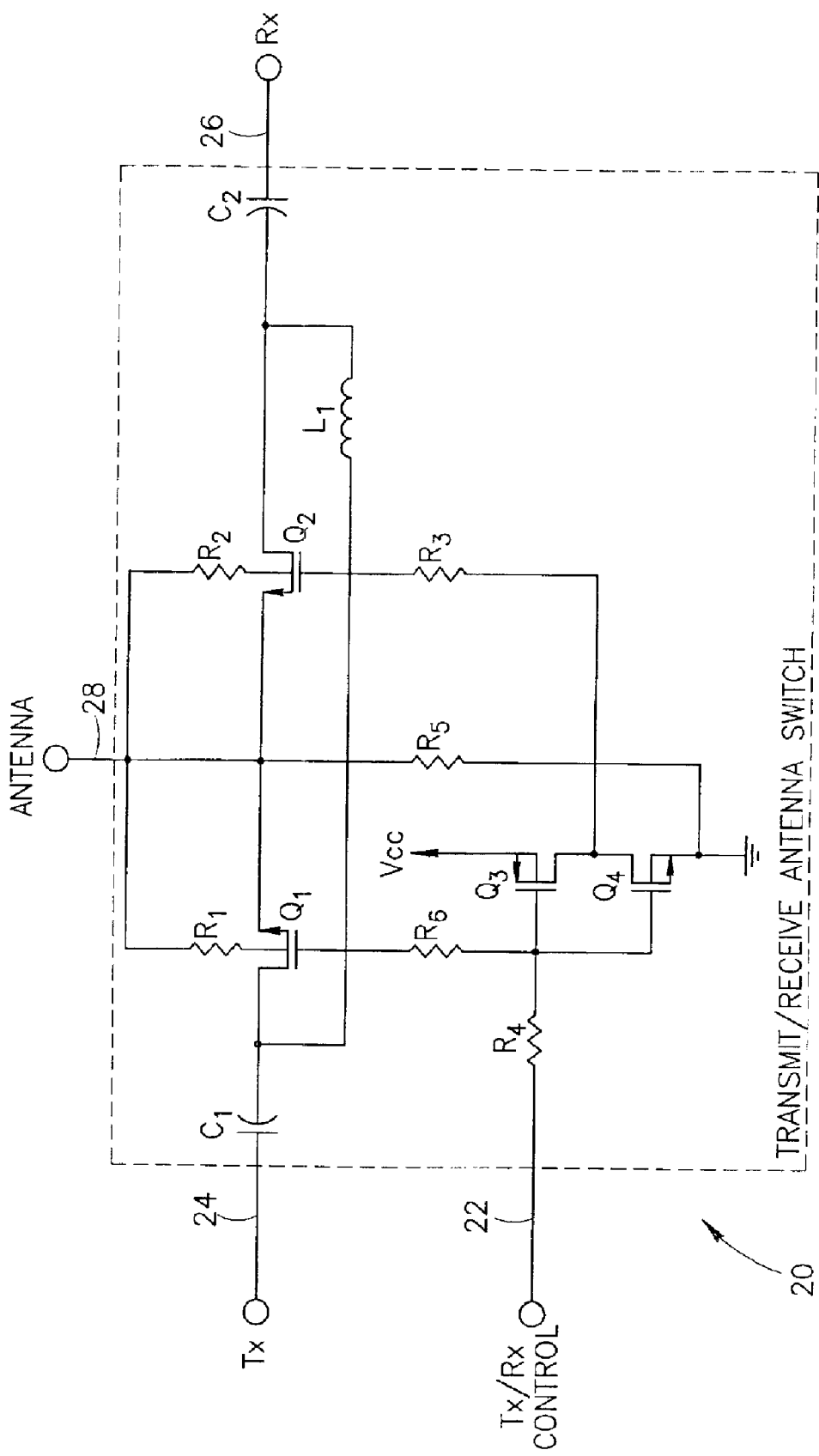
FIG. 2 is a schematic diagram of an example RF antenna switch constructed using FETs with substantially floating substrates in accordance with the present invention.

A schematic diagram of an example RF antenna switch constructed using FETs with substantially floating substrates in accordance with the present invention is shown in FIG. 2. The RF transmit/receive antenna switch, generally referenced 20, comprises an antenna terminal 28 adapted to be connected to an antenna or antenna circuit, a transmit (Tx) terminal 24 adapted to be connected to a transmitter circuit, a receiver (Rx) terminal 26 adapted to be connected to a receiver circuit and a transmit/receive (Tx/Rx) terminal 22 adapted to receive a Tx/Rx switching control signal.

The source terminals of $Q_1$ and $Q_2$ are connected to the antenna port and are connected via resistor $R_5$ to ground. The drain terminal of $Q_1$ is connected to the transmitter port via capacitor $C_1$ and the drain terminal of $Q_2$ is connected to the receiver port via capacitor $C_2$.

The switching function is performed by the series combination of FETs $Q_1$ and $Q_2$. Capacitors $C_1$ and $C_2$ form an impedance matching network to provide 50 Ω transmit and receive terminals. Inductor $L_1$ is placed in parallel across the series combination of $Q_1$ and $Q_2$ in order to tune out parasitic capacitances of the two FETs. The use of a resonant circuit functions to enhance the isolation since the relatively large parasitic capacitance between the source and drain is largely tuned out.

In accordance with the present invention, the substrate terminals of the two FETs $Q_1$ and $Q_2$ are left substantially floating. The values of resistors $R_1$ and $R_2$ are sufficiently high as to have a negligible effect on the insertion loss and isolation of the switch. For example, the use of 5 kΩ resistors results in an insignificant increase of 0.1 dB in the insertion loss of the switch (compared to completely floating substrate terminals). The smaller the value of resistor used, however, the lower the tendency of the switch to enter into a latch-up state. Therefore, an optimum resistor value is high enough to achieve the benefits of increased isolation and reduced insertion loss but low enough to prevent latch-up of the switch. Resistor $R_5$ connected between the antenna and ground has a value of 30 kΩ and is high enough not to negatively effect the performance of the switch.

The state of the antenna switch is controlled by an inverter circuit comprising p-channel FET $Q_3$, n-channel FET $Q_4$, and 5 kΩ resistors $R_3$, $R_4$ and $R_6$. The inverter circuit is adapted to receive the Tx/Rx control signal and to couple either the transmitter or the receiver to the antenna port. In the transmit mode of operation, a high signal on the Tx/Rx control input turns on $Q_1$ and $Q_4$ which keeps $Q_2$ in the off state. In this mode, the transmitter is electrically coupled to the antenna port via $Q_1$. In the receive mode of operation, a low signal on the Tx/Rx control input turns $Q_1$ and $Q_4$ off and $Q_3$ on, which places $Q_2$ in the on state. In this mode, the receiver is electrically coupled to the antenna port via $Q_2$.

Figure 3:
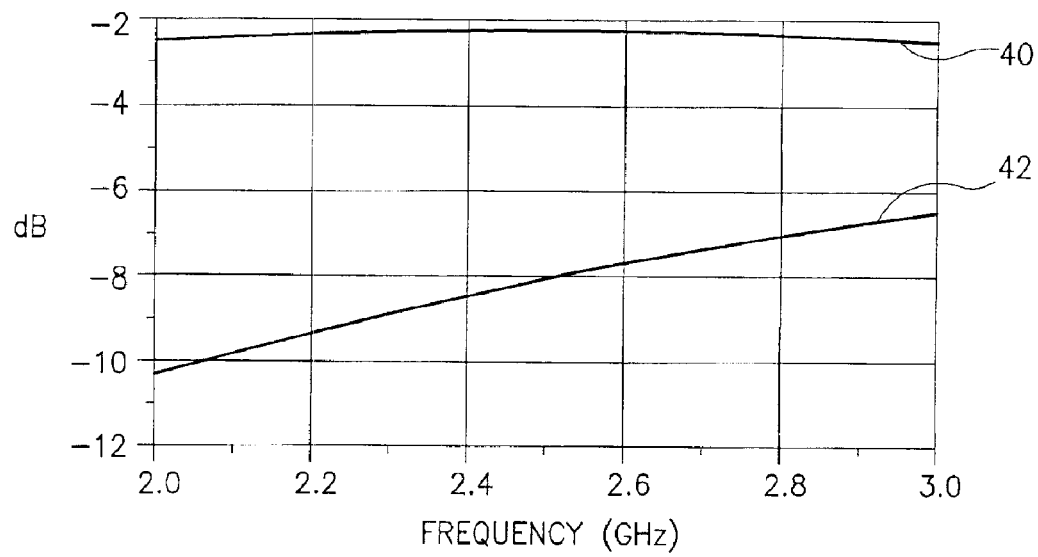
FIG. 3 is a graph illustrating the insertion loss and isolation of a CMOS switch constructed with substrate terminals shorted to ground.

The effectiveness of the present invention over conventional circuits is highlighted in the following two figures. A graph illustrating the insertion loss and isolation of a CMOS switch constructed with substrate terminals shorted to ground is shown in FIG. 3. This graph shows the insertion loss (trace 40) and the isolation (trace 42) of a switch constructed using conventional techniques with FETs whose substrate terminals are shorted to ground. At the frequency of interest (2.47 GHz in the ISM frequency band), the insertion loss is approximately 2.3 dB and the isolation is approximately 8.25 dB.

Figure 4:
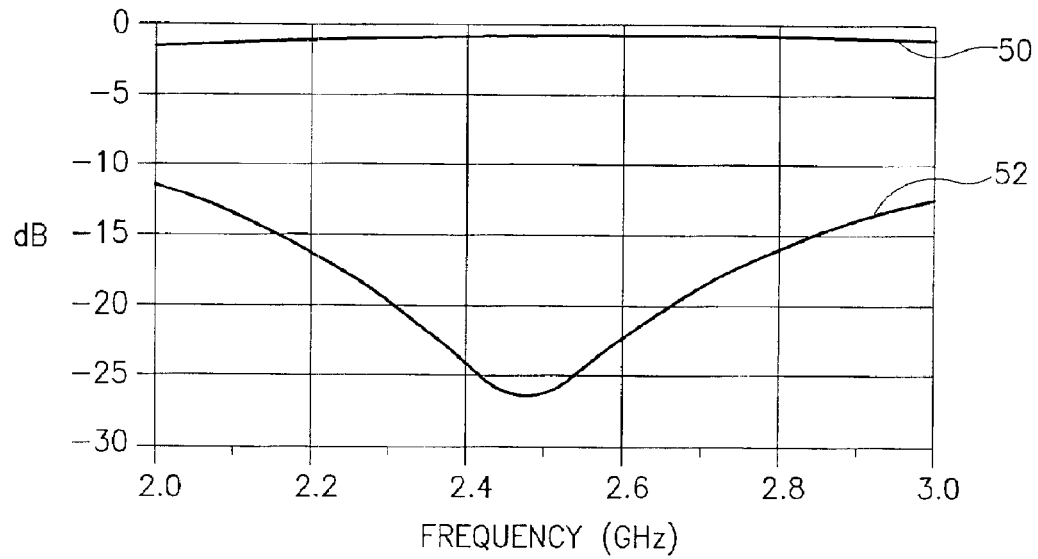
FIG. 4 is a graph illustrating the insertion loss and isolation of a CMOS switch constructed with floating substrate terminals in accordance with the present invention.

A graph illustrating the insertion loss and isolation of a CMOS switch constructed with floating substrate terminals in accordance with the present invention is shown in FIG. 4. Leaving the substrate terminals of the switch floating, in accordance with the present invention, provides for a marked improvement in performance of the antenna switch. At the same frequency of 2.47 GHz, the insertion loss (trace 50) is reduced to about 0.6 dB and the isolation (trace 52) is increased to approximately 26.2 dB.

Note that one skilled in the relevant arts may apply the technique of the present invention of utilizing FETs with floating substrates to other applications as well. Although the application presented above was a non-active circuit without DC current other than RF, the invention may be applied to active circuits as well. In particular, the floating substrate FETs may be used to construct RF power amplifiers. This enables them to be integrated in CMOS RFICs along with the antenna switch. For the same voltage, current and power levels, use of FETs with floating or substantially floating substrates yields amplifiers with higher gain. Care must be taken, however, to avoid latch-up. This can be avoided by using substantially floating substrates (i.e. substrates coupled through high valued resistors) wherein the resistor values are sufficiently low to prevent latch-up but high enough to achieve the beneficial increase in gain.

Integration of Tx/Rx Switch and Power Amplifier in the same Integrated Circuit

Figure 5:
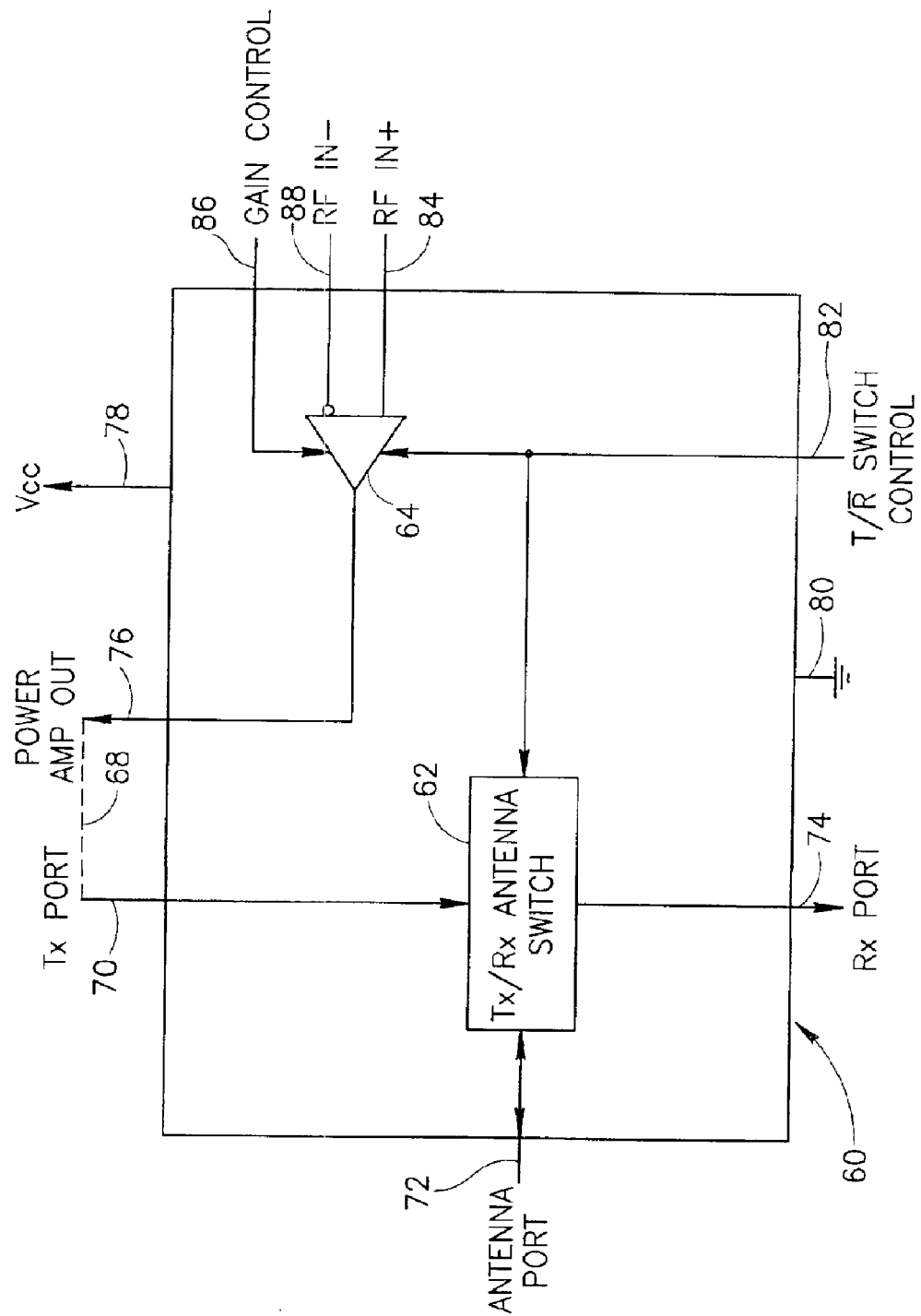
FIG. 5 is a block diagram illustrating the integration of the transmit/receive switch with a power amplifier in the same integrated circuit in accordance with the present invention.

A block diagram illustrating the integration of the transmit/receive switch with a power amplifier (PA) in the same integrated circuit (IC) in accordance with the present invention is shown in FIG. 5. The circuit, generally referenced 60, comprises a Tx/Rx antenna switch such as shown in FIG. 2 and power amplifier circuit 64 both integrated on the same integrated circuit chip. As described supra, pins are provided to the various ports and terminals on the antenna switch 62 and the power amplifier 64. In particular, the chip comprises a Tx port 70, Rx port 74, antenna port 72 and Tx/Rx switch control input 82. The power amplifier related terminals include the differential input pins RF IN−88 and RF IN+84, amplifier output terminal 76, gain control input 86, power ($V_{CC}$) 78 and ground 80 connections.

In the example embodiment described in the figure, the output of the power amplifier is not directly connected to the Tx port of the switch. This is to provide a degree of flexibility whereby (1) the switch can be used alone without the PA or (2) an external amplifier can be cascaded in addition to the internal PA to provide additional gain. The higher power levels are within the capability of the switch. The cost of providing this flexibility, however, is the addition of two extra pins. If no external amplifier is used between the PA and the switch, the output 76 can be directly connected to the Tx port 70 as shown by the dashed connection 68.

The chip has at least two modes of operation: a transmit and a receive mode. In the transmit mode of operation, the Tx/Rx switch control serves a dual function of coupling the Tx port to the antenna and turning on the power amplifier. The gain of the amplifier is set via the gain control signal. In the receive mode of operation, the amplifier is disabled (i.e. power down or off mode) and the Rx port is coupled to the antenna.

The realization of the power amplifier comprises any of the numerous conventional amplifier designs well known in the electrical arts. Examples of RF amplifier circuits suitable for use can be found in U.S. Pat. No. 6,271,727 to Schmukler, entitled "High Isolation RF Power Amplifier With Self-bias Attenuator," U.S. Pat. No. 6,288,612 to Ueno et al., for "Radio Communication Apparatus and Radio Frequency Power Amplifier," and U.S. Pat. No. 6,259,901, to Shinomiya et al., for "Radio-Frequency Power Amplifier of Mobile Communication Equipment," all of which are incorporated herein by reference in their entirety.

The inventors have successfully constructed an integrated circuit such as shown in FIG. 5 for the 2.4 GHz ISM band applications using a high resistivity semiconductor CMOS process. The characteristics of the resultant Tx/Rx antenna switch include 1 dB insertion loss, 15 dB minimum isolation, 1 μA maximum current consumption and 1 μs maximum switching time. The characteristics of the resultant power amplifier include 22 dB small signal gain, class A/AB operation and 2450 MHz+/−100 MHz bandwidth.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A Radio Frequency (RF) antenna switch circuit, comprising:
   first coupling means for electrically coupling an antenna to a transmitter circuit;
   second coupling means for electrically coupling said antenna to a receiver circuit;
   control means for establishing a signal path from said antenna to either said transmit circuit or said receiver circuit in accordance with a transmit/receive control signal; and
   wherein said first coupling means and said second coupling means each comprise one or more field effect transistors (FETs) whose substrate terminals are configured to be substantially electrically floating.

2. The circuit according to claim 1, wherein said signal path comprises a substantially low impedance signal path.

3. The circuit according to claim 1, wherein said first coupling means comprises a single field effect transistor comprising a floating substrate.

4. The circuit according to claim 1, wherein said first coupling means comprises a single field effect transistor having a source terminal, drain terminal, gate terminal and substrate terminal whereby said substrate terminal is electrically connected to ground via a substantially high resistance.

5. The circuit according to claim 1, wherein said first coupling means comprises a single field effect transistor having a source terminal, drain terminal, gate terminal and substrate terminal whereby said substrate terminal is electrically connected to either said source terminal or said drain terminal via a resistor of sufficiently high value.

6. The circuit according to claim 1, wherein said second coupling means comprises a single field effect transistor comprising a floating substrate.

7. The circuit according to claim 1, wherein said second coupling means comprises a single field effect transistor having a source terminal, drain terminal, gate terminal and substrate terminal whereby said substrate terminal is electrically connected to ground via a substantially high resistance.

8. The circuit according to claim 1, wherein said second coupling means comprises a single field effect transistor having a source terminal, drain terminal, gate terminal and substrate terminal whereby said substrate terminal is electrically connected to either said source terminal or said drain terminal via a resistor of sufficiently high value.

9. The circuit according to claim 1, wherein said control means comprises an inverter circuit adapted to provide control signals to said first coupling means and said second coupling means.

10. The circuit according to claim 1, further comprising an inductance placed in parallel across a series combination of said first coupling means and said second coupling means so as to aid in tuning out the parasitic capacitance of said first coupling means and said second coupling means.

11. The circuit according to claim 1 constructed using RF Complimentary Metal Oxide Semiconductor (CMOS) manufacturing techniques.

12. The circuit according to claim 1 integrated into a RF Complimentary Metal Oxide Semiconductor (CMOS) Integrated Circuit (IC).

13. A Radio Frequency (RF) antenna switch circuit, comprising:
   a first field effect transistor (FET) having a drain terminal electrically connected to a transmitter circuit, a source terminal electrically connected to an antenna, a gate terminal and a first substrate terminal, wherein said first substrate terminal is left substantially electrically floating;
   a second field effect transistor (FET) having a drain terminal electrically connected to a receiver circuit, a source terminal electrically connected to said antenna, a gate terminal and a second substrate terminal, wherein said second substrate terminal is left substantially electrically floating; and
   a control circuit adapted to generate gate control signals applied to the gate terminals of said first FET and second FET so as to establish a signal path from said antenna to either said transmit circuit or said receiver circuit in accordance with a transmit/receive input control signal.

14. The circuit according to claim 13, wherein said signal path comprises a substantially low impedance signal path.

15. The circuit according to claim 13, wherein said first substrate terminal is left completely floating.

16. The circuit according to claim 13, wherein said first substrate terminal is electrically connected to ground via a substantially high resistance.

17. The circuit according to claim 13, wherein said first substrate terminal is electrically connected to either said source terminal or said drain terminal via a resistor of sufficiently high value.

18. The circuit according to claim 13, wherein said second substrate terminal is left completely floating.

19. The circuit according to claim 13, wherein said second substrate terminal is electrically connected to ground via a substantially high resistance.

20. The circuit according to claim 13, wherein said second substrate terminal is electrically connected to either said source terminal or said drain terminal via a resistor of sufficiently high value.

21. The circuit according to claim 13, wherein said control circuit comprises an inverter circuit adapted to generate a first gate control signal applied to the gate terminal of said first FET and a second gate control signal applied to the gate terminal of said second FET in accordance with said transmit/receive input control signal.

22. The circuit according to claim 13, further comprising an inductance placed in parallel across the source terminals of said first FET and said second FET to aid in tuning out the parasitic capacitance of said first FET and said second FET.

23. The circuit according to claim 13 constructed using RF Complimentary Metal Oxide Semiconductor (CMOS) manufacturing techniques.

24. The circuit according to claim 13 integrated into a RF Complimentary Metal Oxide Semiconductor (CMOS) Integrated Circuit (IC).

25. A monolithic integrated circuit, comprising:
   a radio Frequency (RF) antenna switch circuit comprising first coupling means for electrically coupling an antenna to a transmitter circuit, second coupling means for electrically coupling said antenna to a receiver circuit, control means for establishing a signal path from said antenna to either said transmit circuit or said receiver circuit in accordance with a transmit/receive switch control signal, wherein said first coupling means and said second coupling means each comprise one or more field effect transistors (FETs) whose substrate terminals are configured to be substantially electrically floating; and
   a power amplifier comprising a differential input, an output, a gain control input and an enable input coupled to said transmit/receive switch control signal, said power amplifier operative to generate an amplified output signal at said output from a signal present at said differential input while enabled by said transmit/receive switch control signal.

* * * * *